(12) United States Patent
Hunter et al.

(10) Patent No.: US 11,250,397 B2
(45) Date of Patent: Feb. 15, 2022

(54) SYSTEM FOR CAPTURE OF PAPER CHECK AND PROCESS OF CHECK PAYMENT TO THIRD PARTY

(71) Applicant: U.S. Bancorp, National Association, Minneapolis, MN (US)

(72) Inventors: Michael P. Hunter, Rosemount, MN (US); Souvik Sarkar, Monroe Township, NJ (US); Anuradha Somani, Princeton, NJ (US)

(73) Assignee: U. S. Bancorp, National Association, Minneapolis, MN (US)

( * ) Notice: Subject to any disclaimer, the term of this patent is extended or adjusted under 35 U.S.C. 154(b) by 0 days.

(21) Appl. No.: 16/700,272

(22) Filed: Dec. 2, 2019

(65) Prior Publication Data

US 2021/0166207 A1 Jun. 3, 2021

(51) Int. Cl.
| | | |
|---|---|---|
| *G06Q 20/10* | (2012.01) | |
| *G06Q 40/02* | (2012.01) | |
| *G06Q 20/32* | (2012.01) | |
| *G06Q 20/04* | (2012.01) | |
| *G06Q 20/02* | (2012.01) | |
| *G06Q 20/40* | (2012.01) | |

(52) U.S. Cl.
CPC ............ *G06Q 20/10* (2013.01); *G06Q 20/02* (2013.01); *G06Q 20/0425* (2013.01); *G06Q 20/32* (2013.01); *G06Q 20/40* (2013.01); *G06Q 40/02* (2013.01)

(58) Field of Classification Search
CPC ............ G06Q 20/042; G06Q 20/0425; G06Q 20/3223; G06Q 40/02; G06Q 20/04; G06Q 20/10; G06Q 20/32; G06Q 30/06
See application file for complete search history.

(56) References Cited

U.S. PATENT DOCUMENTS

| | | | | |
|---|---|---|---|---|
| 10,521,785 | B1 * | 12/2019 | Wilson ................ | G06Q 20/322 |
| 2007/0271183 | A1 * | 11/2007 | Foth .................... | G06Q 40/025 |
| | | | | 705/45 |
| 2012/0030105 | A1 * | 2/2012 | Jones .................. | G06Q 20/108 |
| | | | | 705/42 |
| 2013/0028502 | A1 * | 1/2013 | Nepomniachtchi .. | G06Q 20/042 |
| | | | | 382/137 |
| 2013/0212008 | A1 * | 8/2013 | Edwards .............. | G06Q 20/10 |
| | | | | 705/39 |
| 2014/0279453 | A1 * | 9/2014 | Belchee ............... | G06K 9/4604 |
| | | | | 705/40 |
| 2015/0262136 | A1 * | 9/2015 | Clementi ............ | G06Q 20/042 |
| | | | | 705/45 |
| 2015/0278793 | A1 * | 10/2015 | Roberts ................ | G06Q 20/22 |
| | | | | 705/45 |
| 2017/0091873 | A1 * | 3/2017 | Cole .................... | G06Q 20/10 |

* cited by examiner

*Primary Examiner* — Hao Fu
(74) *Attorney, Agent, or Firm* — Foley & Lardner LLP

(57) ABSTRACT

The disclosure describes an apparatus having programmed instructions that when executed cause the apparatus to receive, via a communication network, a paper check image and payer information captured by an application at a device associated with a checking account holder; build an image file using the received paper check image and payer information; send the built image file to a payee financial institution server using the received payer information; and transmit payment confirmation to the device associated with the checking account holder.

20 Claims, 9 Drawing Sheets

SYSTEM FOR CAPTURE OF PAPER CHECK AND PROCESS OF CHECK PAYMENT TO THIRD PARTY

BACKGROUND

The following description is provided to assist the understanding of the reader. None of the information provided or references cited is admitted to be prior art.

Paper checks enable checking account holders to pay for products and services in a convenient way. Electronic payments and mobile payment technologies have replaced paper check payments in part but not completely. Despite technological advancements enabling these other payment processes, many parties continue to use paper checks for transactions. Heretofore, attempts have been made to improve on the inefficiencies and drawbacks of paper check transactions. What is needed is a system that enables the electronic truncation of a paper check that is then electronically transmitted to the payee for subsequent deposit, and with timely acknowledgment of payment receipt going to both the payer and the payee.

SUMMARY

In accordance with the present disclosure, a system is disclosed to enable electronic processing of a paper check written from a payer to a payee. An image of the paper check is captured using an application on a device controlled by the user along with data about the third party to whom payment is intended. The user device transmits the image and data via a software application to the payee bank (or other financial institution). The payee bank receives the image and data at a server that builds an image file with the received image(s) and data. The images and data can be formatted as an image cash letter (ICL) file such as an intraday or end of day (EOD) biller X9 image file. Alternatively, the images can be aggregated and presented to the payee for review in a Remote Deposit Capture (RDC) application for deposit. The payee bank ingests and validates conformity of the check images and data. The payee bank can send an electronic acknowledgment back to the user device to confirm receipt of the payment by the payee. The bank deposits (credits) the accumulated funds into the payee's DDA account at the bank and transmits electronic check information to the Federal Reserve or directly to the payer financial institution for presentment (debit) to the payer.

In accordance with the present disclosure, an apparatus includes programmed instructions that when executed cause the apparatus to receive, via a communication network at a payee financial institution server, a paper check image and payee information contained within an application at a device associated with a checking account holder; build an image file using the received paper check image and payer information from the application at the device; and transmit payment confirmation to the device associated with the checking account holder. Alternatively, an apparatus may be a Remote Deposit Capture (RDC) application that when executed, cause the apparatus to receive, via electronic communication from an application on the user device, a paper check image and payment data to be aggregated and presented for review to the payee. Upon approval, the value of the image checks to be credited to the payee Demand Deposit Account (DDA), and subsequently sent for forward presentment though banking channels, to be debited from the payer's checking account at their financial institution.

In accordance with the present disclosure, a computerized method is disclosed. The computerized method includes receiving, via a communication network, a paper check image and payer information captured by an application owned by a payee financial institution, on a device associated with a checking account holder; constructing, by a processor, an image file using the received paper check image and payer information; communicating, from the processor, the built image file to a payee financial institution server; and providing, payment confirmation to the application on the device associated with the checking account holder, within the application, as well as via device alerts and other electronic communications.

In accordance with the present disclosure, a non-transitory computer readable media with computer-executable instructions embodied thereon that cause a system to perform a process. The process includes receiving a paper check image and payer information captured by an application at a device associated with a checking account holder; constructing an image file using the received paper check image and payer information; communicating the built image file to a payee financial institution server; and providing payment confirmation to the device associated with the checking account holder.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
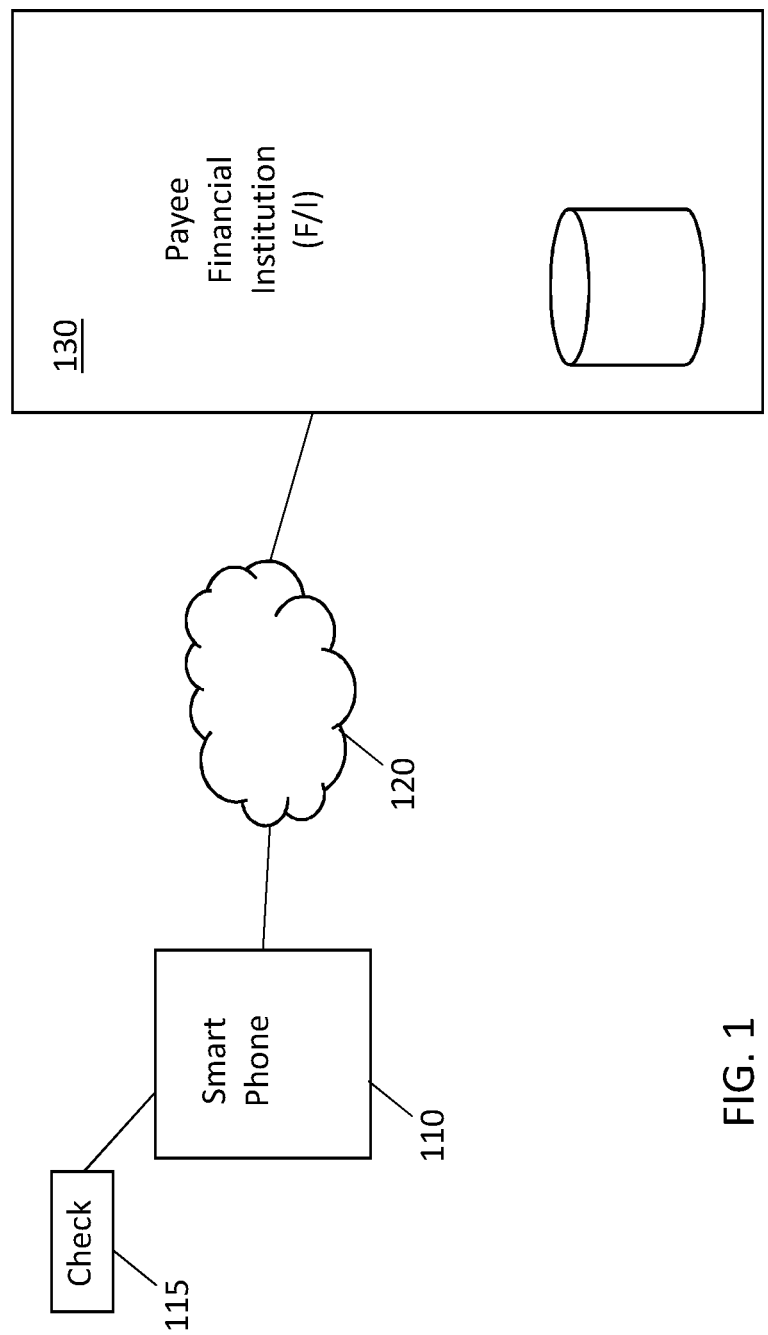
FIG. 1 is an example block diagram of a paper check payment system in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to a system that captures a paper check image and identifies bank account information a MICR (magnetic ink character recognition) line of the paper check. In an exemplary embodiment, the paper check image is captured using a camera on a smartphone or similar device, such as a computer tablet. The smartphone includes a processor and programmed instructions for a software application enabling the smartphone to present a graphical user interface (GUI) to facilitate the user in paying a bill by paper check. The software application is specifically programmed for a particular biller, which includes a GUI with branding for the biller. The software application communicates the paper check information to the biller's financial institution for deposit of the funds into the biller's account. Once received by a server of the financial institution, the server of the payee or the server of the software application sends a confirmation message to the smartphone to verify that payment was received. The server at the bank's financial institution converts the paper check image to an image cash letter and processes the payment.

Advantageously, the present disclose describes technical aspects necessary to consummate a payment via truncated paper check instead of a simple check deposit sent via mail, drop box or person present. Prior systems have not enabled customers to make payments using paper checks in this manner. The present disclosure describes the technical challenges and the technical solutions associated with such a system. Technical challenges include: since the adoption of the Check Clearing Act for the 21$^{st}$ Century (Check 21) on Oct. 3, 2003, the burden has been on banks or the payee/receiver of the paper check instrument to truncate/convert the item to a compliant image check. The embodiments described herein gives this capability to the payer, within an application controlled by the payee and payee's financial institution. This solution reduces burdensome effort on the payer side to either mail, find a drop box or physically hand the check to the payee. Regulations do not allow payers to deposit checks directly into the accounts of billers/payees. This restriction extends to traditional mobile remote check deposit. The disclosed system allows the payers to capture and send the check payments via mobile capture, yet it is the payee making the deposit into their own Demand Deposit Account (DDA) and their financial institution. Another drawback of existing check payment systems is the lack of acknowledgement available to the payer. Currently, check payers are unable to validate the payee has received their check payment, until such a time that the check instrument clears their checking account and debits the balance. This is often time 3-5 days after the check has been mailed. The disclosed system provides the payer with an expedited acknowledgement via push notification to mobile device, as soon quickly as the same day, to their mobile device that their payment has been received by the payee for processing. This provides the payer with 'credit' from the payee that their payment was made and received, similar to an envelope postmark in the current process for sending check payments. This innovation has immense applications in instances of urgent payments. For example, rental payments can be made by check, on the due date, without worry of late payment penalty fees.

FIG. 1 illustrates an example electronic check payment system 100 that includes a smart phone 110 including the capability to capture an image of a paper check 115, a communication network 120 that facilitates communications to and from the smartphone 110, a payee financial institution 130 having an account for a billing entity that receives the funds of the paper check 115. The smart phone 110 includes a processor and memory with programmed instructions to enable the smart phone 110 to capture and process images such as an image of the paper check 115. After the image of the paper check 115 is captured, an application on the smart phone 110 identifies a banking routing number and checking account number from information on the paper check 115. Identification of this information can be done using character recognition techniques or the account information can be entered by the payer. The dollar amount of the paper check 115 can be input into the smart phone 110 by the user or character recognition techniques can be used to identify the amount written on the paper check 115. The application on the smart phone 110 also receives information about the payment, including associated payment information relevant to the payee. In some embodiments, information about the payee financial institution is stored in the application accessed by the mobile device 110. The smart phone 110 encrypts the transaction information and communicates it to the payee financial institution 130 via the network 120. The network 120 can be a data network such as the Internet or a data network available via cellular technologies.

Figure 2:
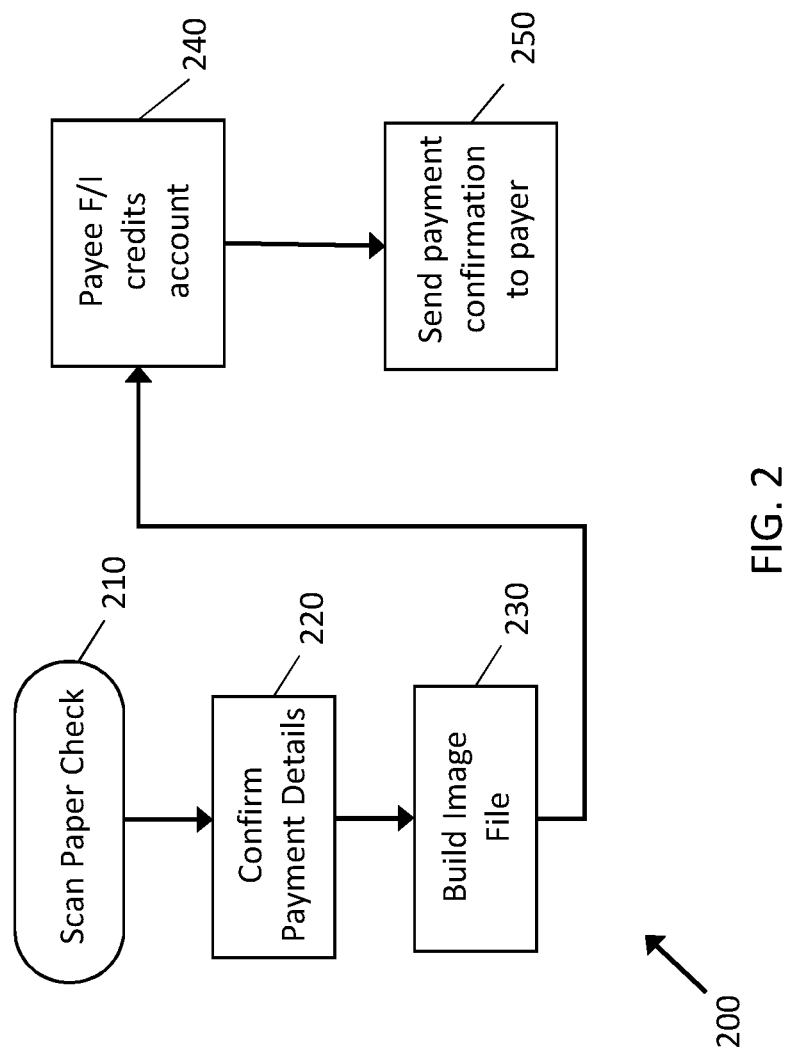
FIG. 2 is an example flow diagram of a paper check payment system in accordance with some embodiments of the present disclosure.

FIG. 2 illustrates an exemplary flowchart outlining electronically processing of a paper check in accordance with some embodiments of the present disclosure. Additional, fewer, or different operations may be performed in the method depending on the implementation and arrangement. The method 200 includes a smartphone device taking a photo of a paper check (210), a server at the payee's financial institution confirming payment details upon receipt of the paper check image (220), the server building an image cash letter (ICL) file (230), the server crediting the payee DDA account for the check instrument funds (240), and the server sending payment confirmation to the payer (250).

At operation 210, a first person wanting to send payment to a second person or company captures an image of a paper check with payment details written on it using a smart phone or other such device capable of electronically capturing an image. In at least one embodiment, the paper check is captured using a smart phone application or "app" provided by the financial institution where the second person or company has a Demand Deposit Account. The smart phone app is a program stored in the memory of the smart phone and is programmed to capture images and transmit the images and associated data to a server of the financial institution. In at least one embodiment, in addition to capturing the paper check image, the smart phone app requests data entry of the first person including the amount of the check, the name of the second person or company where the payment is going. At operation 220, the application on the first person's device verifies that the front and rear of the check image was captured correctly, and that the check MICR information and the values in the Legal Amount and Courtesy Amount sections of the check were successfully and accurately read. At operation 230, the server at the financial institution builds an image cash letter (ICL) file for the paper check image. The ICL file can be generated by the payee financial institution or, in some embodiments, by the smartphone device.

At operation 240, the payee's financial institution validates the image(s) and data received in the image file and credits the payee's Demand Deposit Account for the value of the file. At operation 250, the server sends a payment confirmation to the payer in the form of an email message, an SMS text message, or other electronic communication. Advantageously, unlike conventional payment systems involving a paper check, the payer receives an acknowledgement of payment, which can be very helpful as proof of the date of payment for certain transactions, such as urgent collections. Furthermore, the payee receives notice of payment instantaneously and automatically.

Figure 3:
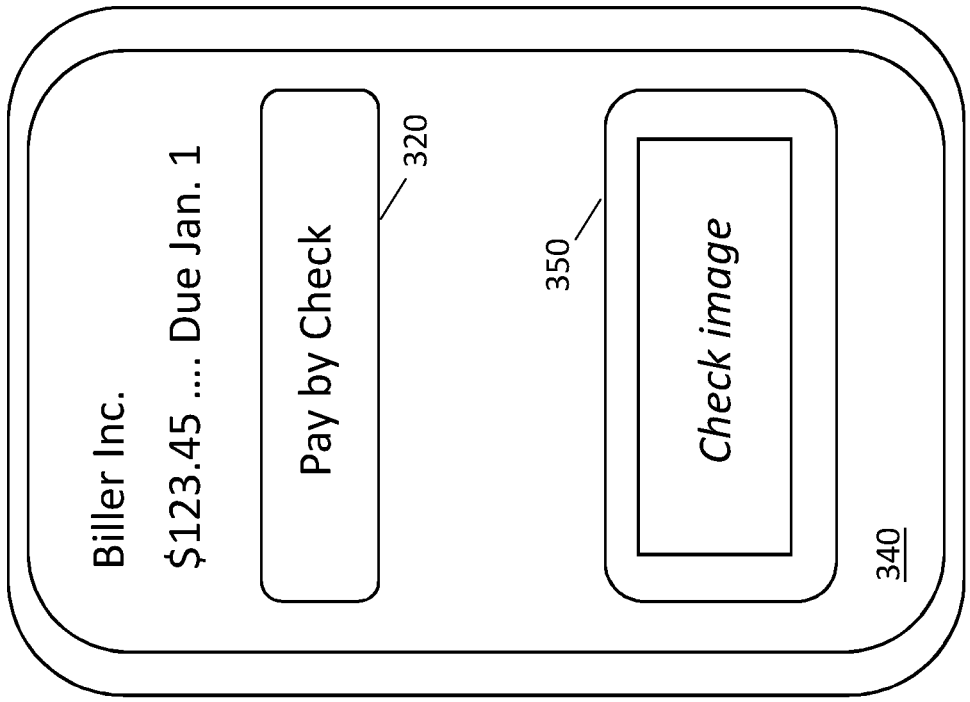
FIG. 3 is an example graphical user interface for a software application on a smartphone programmed to capture paper check images in accordance with some embodiments of the present disclosure.
Figure 3:
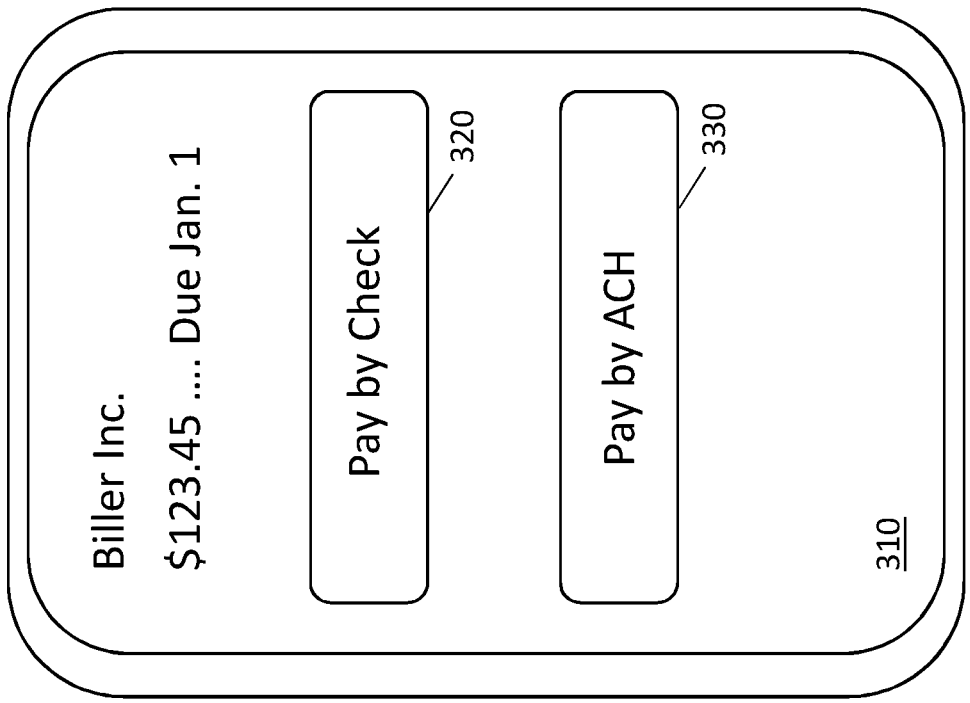

FIG. 3 illustrates exemplary graphical user interfaces (GUIs) of a smart phone device having programmed instructions to present the GUI to guide the user through a process of capturing a check image to pay an invoice or bill to a biller. GUI 310 includes buttons 320 and 330 for a user to select a payment option. When a user selects button 320, a GUI 340 presents a view window 350 of a view from a camera of the smart phone device. A variety of different GUIs may be presented in a variety of different configurations. The programmed instructions stored in the smart phone that enable the presentation of the application for payment of a bill by paper check are executed by a processor (not shown) and stored in a memory (not shown).

Figure 4:
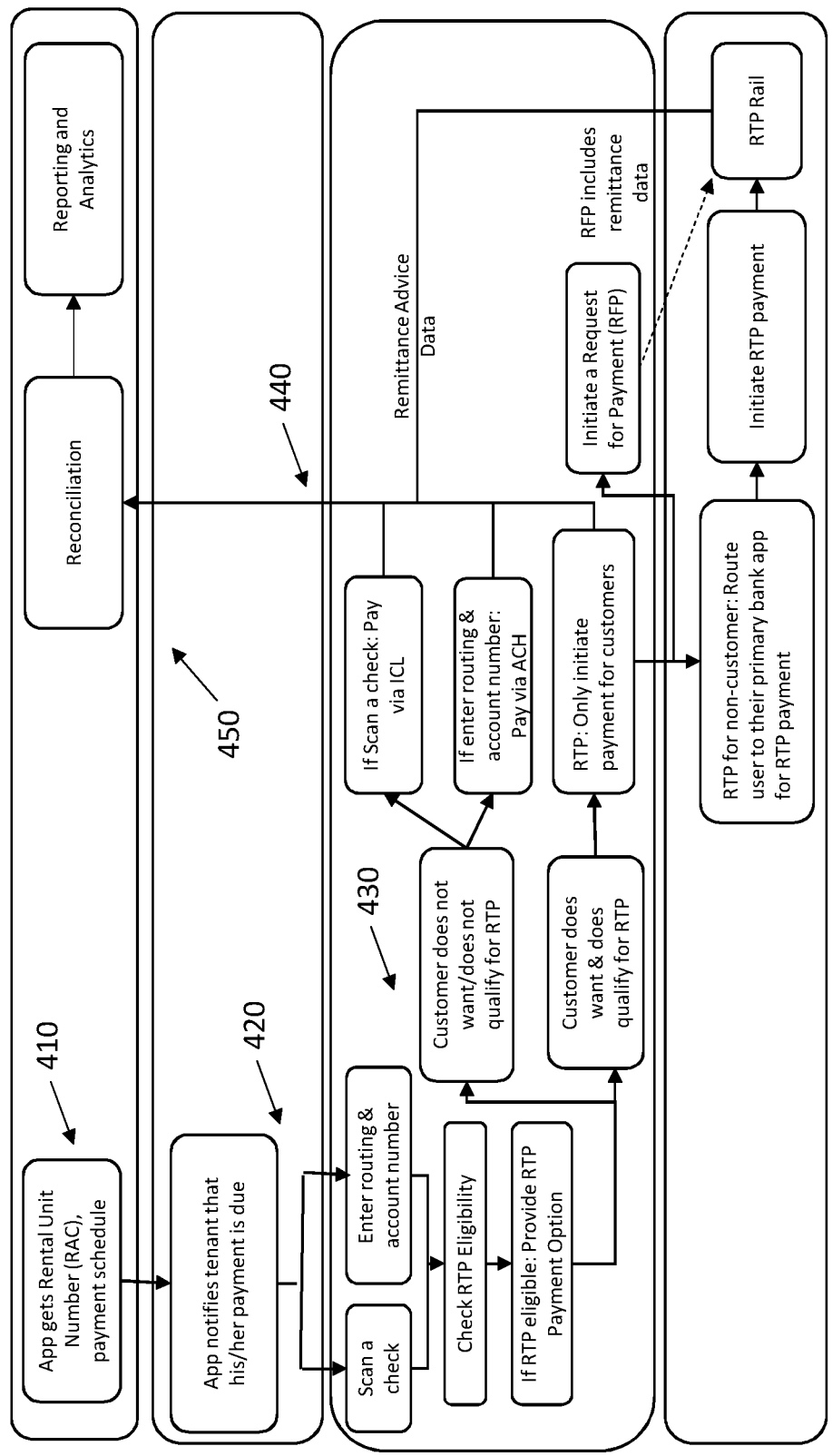
FIG. 4 is an example block diagram of a collections solution workflow, in accordance with some embodiments of the present disclosure.

FIG. 4 illustrates an exemplary flowchart outlining payment of rent to a leasing company using a paper check payment system in accordance with some embodiments of the present disclosure. Additional, fewer, or different operations may be performed in the method depending on the implementation and arrangement. The method 400 conducted by an electronic check payment system (e.g. electronic check payment system 100 shown and described with reference to FIG. 1) includes communicating payment details to a tenant computing device (410), receiving an image of a paper check from the tenant computing device (420), verifying eligibility for RTP (real time payment) (430), providing remittance data for an image cash letter (ICL) (440), and making funds available for payment to a leasing company (450).

At operation 410, a leasing company provides a tenant with a software application ("app") that is set up with a rental unit number and a payment schedule. The app can be installed on a smart phone and can provide the tenant with notification that the rent payment is due. The app can also include a history of payments made and a schedule of payments due. At operation 420, the tenant fills out a paper check and uses the smart phone app to capture an image of the paper check. Alternatively, the tenant can enter routing and account numbers for the tenant's account. At operation 430, a computer server having a processor with programmed instructions checks to make sure that the tenant's account is eligible for real time payments and provides that option to the tenant. If the tenant does not want to use real time payments, data from the tenant is used by the server to either arrange payment via ACH or via image check in an operation 440. At operation 450, data about the tenant's payment are made available to the leasing company.

Figure 5:
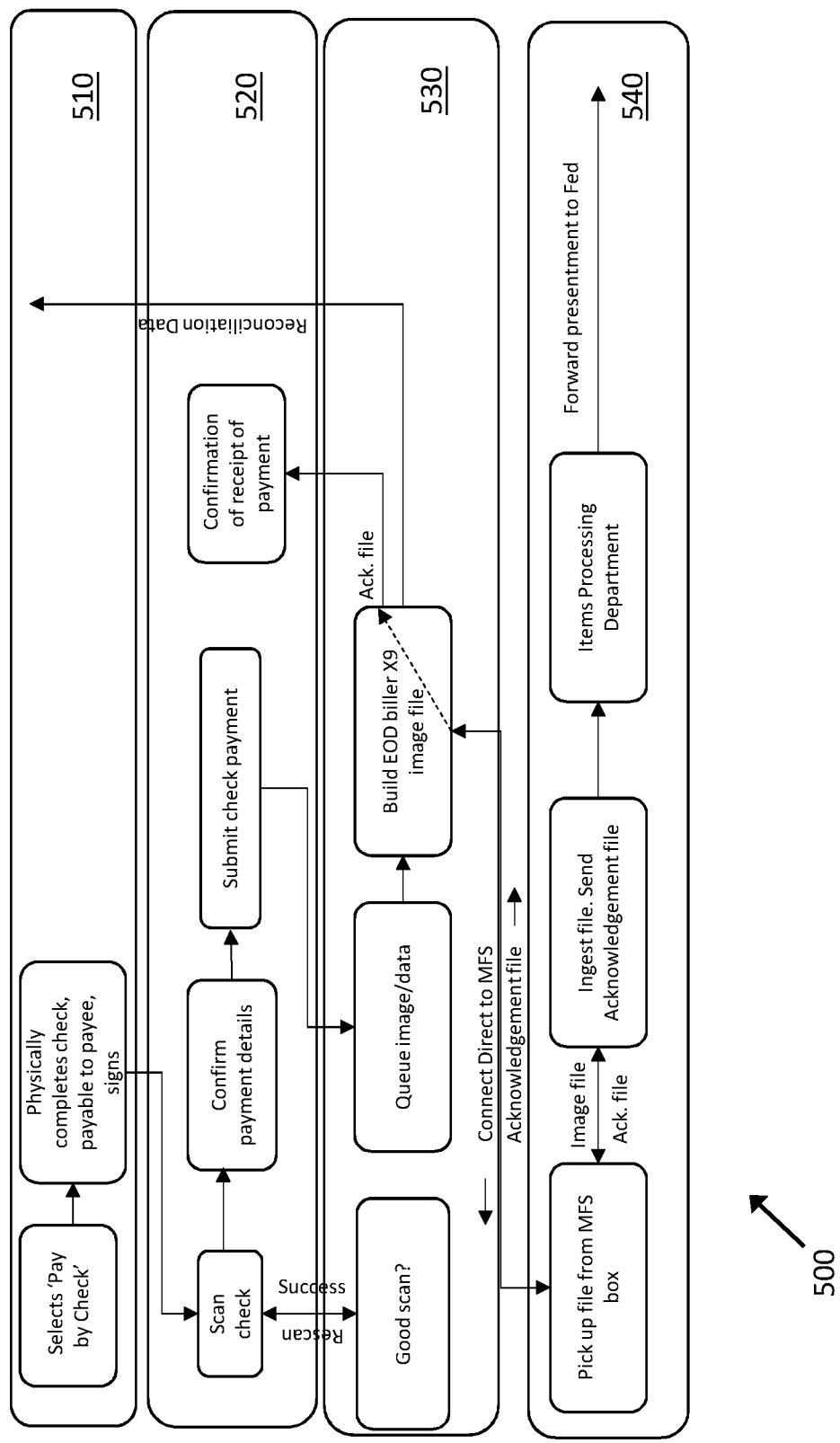
FIG. 5 is an example block diagram outlining a process for digital check payment in accordance with some embodiments of the present disclosure.

FIG. 5 illustrates an exemplary flowchart outlining a process for digital check payment in accordance with some embodiments of the present disclosure. Additional, fewer, or different operations may be performed in the method depending on the implementation and arrangement. The method 500 conducted by an electronic check payment system (e.g. electronic check payment system 100 shown and described with reference to FIG. 1) includes selection by a checking account holder of a "Pay by Check" option on a smartphone user interface (510), scanning or image capturing of a completed paper check by a smartphone application (520), processing the image including the building of an image cash letter file (ICL) for the captured image(s) by a computer (530), and processing the ICL for presentment (540).

At operation 510, a checking account holder physically completes a paper check, payable to a payee, and signs. The account holder launches a smart phone app configured to capture an image of the completed check and receive payee information from the account holder via a user interface on the smartphone app.

At operation 520, the check image and data are captured from the physical check using the smartphone. The app confirms a compliant image scan of the front and rear of the check, as well as proper capture of the associated payment data. The server builds an image cash file (ICL) formatted file, such as an end of day (EOD) biller X9 image file in an operation 530. After the image and data are input into the ICL formatted file, the server confirms receipt of payment to the checking account holder and the ICL is processed for presentment to the Federal Reserve, or direct to the payer financial institution in operation 540.

Figure 6:
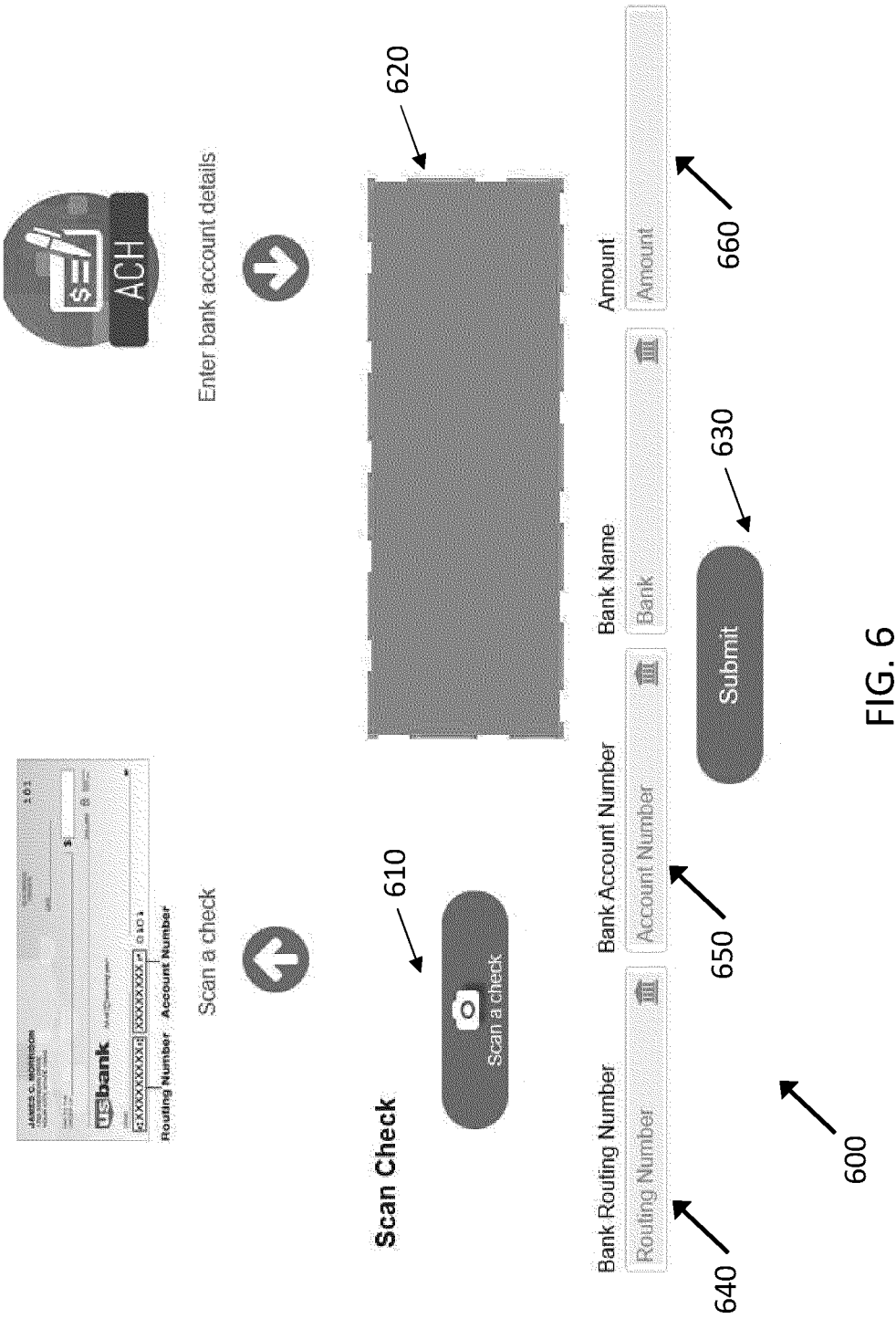
FIG. 6 is a diagrammatic representation of a paper check payment system in accordance with some embodiments of the present disclosure.
Figure 7:
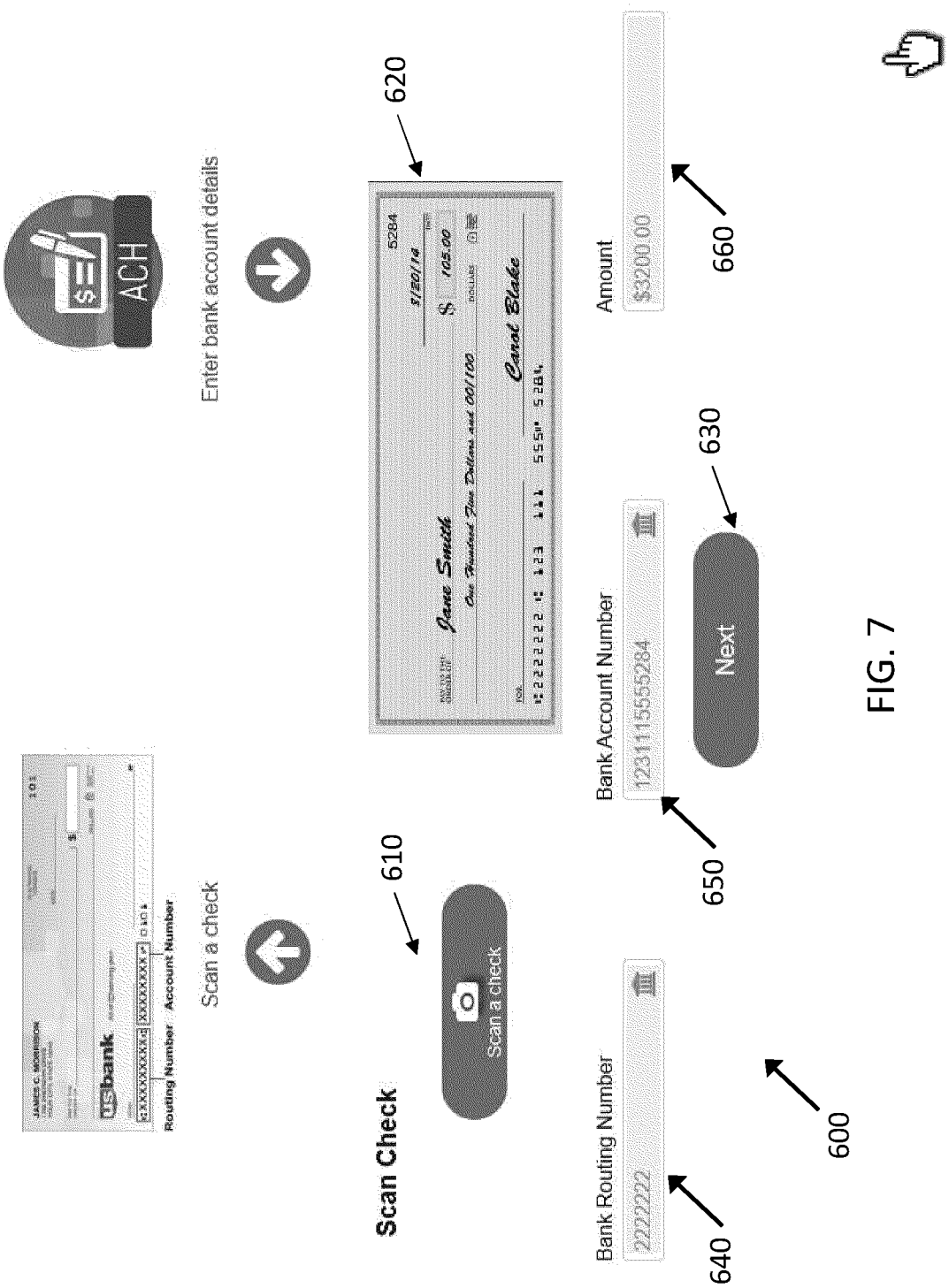
FIG. 7 is a diagrammatic representation of a paper check payment system in accordance with some embodiments of the present disclosure.

FIGS. 6 and 7 illustrate a representation of a graphical user interface (GUI) 600 for a software application on a device with a camera in which a scan check option is selected. The GUI 600 includes a scan check button 610 that engages a capture screen 620 to capture an image from a camera of the device. Once the image is captured, fields 640, 650, and 660 for the bank routing number, bank account number, and check amount are populated using information extracted from the check. The user can visually verify that the numbers in fields 640, 650, and 660 are correct before clicking the "next" button 630. Alternatively, the user can manually enter the routing number, bank account number, and check amount into fields 640, 650, and 660.

Figure 8:
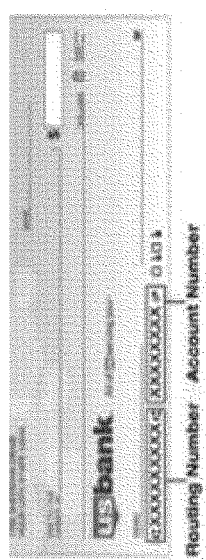
FIG. 8 is a diagrammatic representation of a paper check payment system in accordance with some embodiments of the present disclosure.
Figure 8:
Figure 8:
Figure 8:
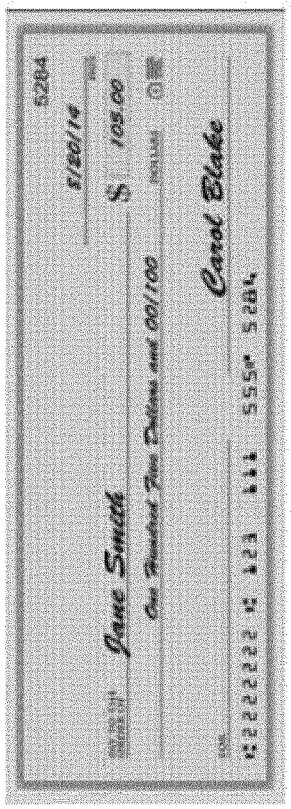
Figure 8:
Figure 8:
Figure 8:

FIG. 8 illustrates a representation of a graphical user interface (GUI) 800 for a software application on a device with a camera in which a scan check option is selected. The GUI 800 includes a scan check button 810 that engages a capture screen 820 to capture an image from a camera of the device. A selection portion 830 is included in the GUI 800 for the user to select an instant transfer or a digital check payment. Once the image is captured, fields 840, 850, and 860 for the bank routing number, bank account number, and check amount are populated using information extracted from the check.

Figure 9:
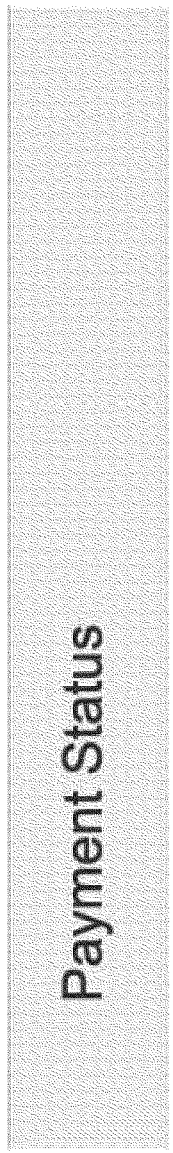
FIG. 9 is an example graphical user interface showing confirmation of payment sent using a paper check payment system in accordance with some embodiments of the present disclosure.
Figure 9:
Figure 9:

FIG. 9 is a graphical user interface (GUI) 900 showing confirmation of payment sent using a paper check payment system. The GUI 900 includes details of the transaction including the account, the amount paid, and a payment transaction identifier.

The described system and method provide a number of technical advantages over prior systems and method. For example, the described system and method removes paper from the payment work stream while providing a secure transfer of payment information that enables payment of a third party. The described system and method also provide a feedback loop to the payer that does not exist in convention paper check systems. The payer receives an acknowledgement of payment that can be used as proof of date of payment. The payee also receives notification of payment once it is entered. As Real Time Payments (RTP, Zelle, Venmo, etc.) gain traction and grow within the payments industry, consumers and businesses will expect transparency from their billers and financial institutions. Checks have historically lacked transparency in relation to what the status of the transaction, specifically when will the biller (payee) acknowledge receipt of the payment, and therefore fulfilment of the payment obligation of the payer. The disclosed system reduces time associated with the transfer of the paper check instrument from the payer to the payee by digitizing the physical item as soon as the payer fills it out. The disclosed system therefore reduces the fraud risk inherent with the paper check payment while being transferred to the payee via mail, drop box or physically handing it over.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

The graphical interfaces described with reference to the Figures provide particular advantages in that images of a paper check can be captured and viewed by the payer before transmission to the payee in a manner that allows the user to verify important information taken from the paper check, including bank routing number, bank account number, and amount paid. The process executed by the software application at the user's device complies with paper check requirements while providing digital record of payment and receipt.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus comprising:
   a processor having programmed instructions stored in memory that when executed by the processor cause the processor to:
   provision, by a server of a payee financial institution to a mobile device of a payer, an application enabling communication between the server and the mobile device,
      wherein the application on the mobile device:

presents, on a display of the mobile device, a user interface comprising a scan widget configured to facilitate scanning of paper checks and a payee widget configured to receive names of payees, receives a check image of a paper check depicted on the scan widget from an image capture apparatus on the mobile device, the paper check corresponding to a payer account of the payer, receives a name of a payee via the payee widget, inputs the check image and the received name of the payee into an image file, and transmits the image file containing the check image and the received name of the payee to the server of the payee financial institution;

receive, at the server of the payee financial institution and from the application on the mobile device of the payer, the image file, wherein the paper check corresponds to a payer account of the payer;

validate, at the server, conformity of the paper check image including checking magnetic ink character recognition (MICR) information on the check image and payer information for the payer account associated with a payer financial institution;

process, by the server, the image file based on the paper check image for presentment to the payer financial institution and payment deposit to a payee account of the payee financial institution, the payee account corresponding to the received name of the payee;

provide notification, to the mobile device, of receipt of the paper check image upon validation; and transmit payment confirmation to the mobile device.

2. The apparatus of claim 1, wherein the payee financial institution server is different from a payer financial institution server.

3. The apparatus of claim 1, wherein the image file is an image cash letter (ICL) formatted file.

4. The apparatus of claim 1, wherein the image file is an end of day biller X9 format image file.

5. The apparatus of claim 1, wherein the apparatus verifies that the paper check image is a good scan.

6. The apparatus of claim 1, wherein the programmed instructions that when executed further cause the apparatus to process the paper check image including forwarding presentment to a Federal Reserve or directly to the payee financial institution server.

7. The apparatus of claim 1, wherein the programmed instructions that when executed further cause the apparatus to process the image file by retrieving the received name of the payee from the image file.

8. A computerized method comprising:

provisioning, by a server of a payee financial institution to a mobile device of a payer, an application enabling communication between the server and the mobile device, wherein the application on the mobile device:

presents, on a display of the mobile device, a user interface comprising a scan widget configured to facilitate scanning of paper checks and a payee widget configured to receive names of payees, receives a check image of a paper check depicted on the scan widget from an image capture apparatus on the mobile device, the paper check corresponding to a payer account of the payer, and receives a name of a payee via the payee widget;

inputs the check image and the received name of the payee into an image file, and transmits the image file containing the check image and the received name of the payee to the server of the payee financial institution;

receiving, at the server from the application on the mobile device of the payer, the paper check image and the name of the payee, the paper check image having payment information written thereon and payer information for a payer account captured by the application;

validating, by the server, conformity of the paper check image including checking magnetic ink character recognition (MICR) information on the check image and payer information for the payer account associated with a payer financial institution;

presenting an image file based on the paper check image to the payer financial institution and depositing payment at the payee financial institution, the payee account corresponding to the received name of the payee;

providing notification, to the customer device, of receipt of the paper check image upon validation; and providing, from the processor, payment confirmation to the customer device associated with the payer.

9. The method of claim 8, further comprising sending reconciliation data to the payee financial institution server.

10. The method of claim 9, wherein the reconciliation data includes deposited item detail.

11. The method of claim 8, further comprising verifying the paper check image contains complete data necessary for processing.

12. The method of claim 8, wherein the paper check image is received by the payee financial institution server.

13. The method of claim 8, wherein a payer financial institution computer server is different than the payee financial institution server.

14. A non-transitory computer readable media with computer-executable instructions embodied thereon that, when executed by a processor of a system, cause the system to perform a process comprising:

provisioning, by a server of a payee financial institution to a mobile device of a payer, an application enabling communication between the server and the mobile device, wherein the application on the mobile device:

presents, on a display of the mobile device, a user interface comprising a scan widget configured to facilitate scanning of paper checks and a payee widget configured to receive names of payees, receives a check image of a paper check depicted on the scan widget from an image capture apparatus on the mobile device, the paper check corresponding to a payer account of the payer, receives a name of a payee via the payee widget;

inputs the check image and the received name of the payee into an image file, and transmits the image file containing the check image and the received name of the payee to the server of the payee financial institution;

receiving, by the server and from the application on the mobile device of the payer, the paper check image and the name of the payee, the paper check image having payer information for a payer account captured by the application;

validating conformity of the paper check image including checking magnetic ink character recognition (MICR) information on the check image and payer information for the payer account associated with a payer financial institution;

presenting an image file based on the paper check image to the payer financial institution and instructing payment to a payee account of the payee financial institution, the payee account corresponding to the received name of the payee;

providing notification, to the mobile device, of receipt of the paper check image upon validation; and providing payment confirmation to the mobile device associated with the payer.

15. The non-transitory computer readable media of claim 14, further comprising sending reconciliation data to the application on the payer customer device.

16. The non-transitory computer readable media of claim 15, wherein the reconciliation data includes deposited item detail.

17. The non-transitory computer readable media of claim 14, further comprising verifying the paper check image contains complete data necessary for processing.

18. The non-transitory computer readable media of claim 14, wherein the paper check image is received by a payer financial institution server.

19. The non-transitory computer readable media of claim 14, wherein a payer financial institution server is different than the payee financial institution server.

20. The non-transitory computer readable media of claim 14, wherein the image file is an image cash letter (ICL) formatted file.

* * * * *